Feb. 10, 1959  L. M. NIJLAND ET AL  2,873,221
METHOD OF TREATING SEMI-CONDUCTIVE BODIES
Filed Oct. 29, 1956
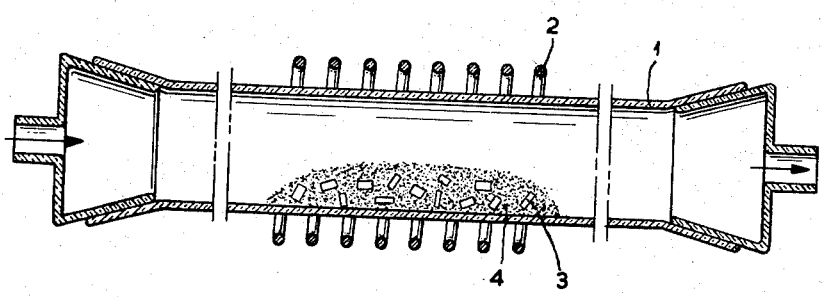
INVENTOR
LOUIS MARIUS NIJLAND
PIETER WILLEM HAAIJMAN
BY
AGENT

United States Patent Office 2,873,221
Patented Feb. 10, 1959

2,873,221
METHOD OF TREATING SEMI-CONDUCTIVE BODIES

Louis Marius Nijland, and Pieter Willem Haaijman, Eindhoven, Netherlands, assignors, by mesne assignments, to North American Philips Company, Inc., New York, N. Y., a corporation of Delaware Application October 29, 1956, Serial No. 618,889

Claims priority, application Netherlands November 5, 1955

5 Claims. (Cl. 148—1.5)

In the manufacture of semi-conductive bodies, for example those consisting of germanium or silicon, these bodies must frequently be subjected to a thermal treatment under the action of foreign material. The object of such a treatment, in which diffusion processes mostly play an important part, may be, for example, to vary the conductivity type or the specific resistance of such bodies either superficially or throughout. The said foreign material usually is an element or a compound having donor or acceptor properties or both properties at the same time. Because of the influence exerted by it upon the semi-conductive body, it will be indicated hereinafter as the active material.

It is common practice to carry out the thermal treatment in a closed space into which the active material is introduced in the solid, liquid or gaseous state. It has previously also been suggested to dissolve the active material in a metal or an alloy and to fuse the resultant mixture locally on the semi-conductive body, thus exposing this body to the influence of the active material; after this treatment, the mixture or the alloy was removed from the body by mechanical means.

Such methods have several disadvantages. The admission of the active material in the liquid or gaseous state to the closed space is difficult in technical respect. If the active material is fused on the semi-conductive body in the solid state either directly, or dissolved in, or bound with another element or alloy, there is a great chance of the substance mechanically adhering to the body and thus causing damage to it. Moreover, in certain cases, the active material escapes from the space too rapidly, more particularly if the treatment takes place in a flowing protective gas.

The object of the invention is inter alia to obviate said disadvantages.

According to the invention, the active material is mixed with a neutral solid material which is maintained in contact with the body during the thermal treatment, whereby the inert material itself is not fused.

The term "mixing" must be regarded in this case in a wide sense and also means, for example, that the active material is adsorbed in the neutral or indifferent material. The term "indifferent" thus has reference only to the passive character with respect to the semi-conductive body during the conditions which prevail during treatment. The expression "solid material" is to be understood to exclude liquids and gases; the indifferent material, however, can be used either in the powdered state or in the form of a body, for example, a pill or pellet or a thin rod.

The indifferent or inert material used may be chosen, for example, from the many oxides having a high fusion point, more particularly silicon dioxide.

The mixing ratio of the active and the indifferent material is usually not critical, since the reaction of the active material upon the semi-conductive body is usually dependent upon the duration of the treatment and the temperature during the treatment rather than upon the concentration of the active material in the indifferent substance. Thus, a strong dilution of the active material in the indifferent substance is either not objectionable at all, or this objection may be obviated by a longer duration of the treatment or increasing the temperature. When the active material has a tendency to adhere to the semi-conductive body, the amount of indifferent material must be larger, the greater is the tendency of adhesion of the active material. In general, the indifferent material will predominate in the mix. A favourable ratio may be determined in a simple manner by making some tests.

In order that the invention may be readily carried into effect, it will now be described with reference to several examples which are clarified by means of the sole figure in the accompanying drawing.

The figure shows dagrammatically a device in which the method according to the invention may be carried out. However, many modifications of this device are possible.

The device comprises a highly-refractory tube 1 for example of quartz, through which a determined gas, for example nitrogen or a mixture of nitrogen and hydrogen, may be flown as indicated by two arrows. The tube may be heated as shown diagrammatically by means of a heating coil. The tube contains several semi-conductive bodies 3, each covered with powder 4.

We shall now describe hereinafter six methods which, for example, may be carried out in such a device.

I. A thin germanium disc of the p-type having a specific resistance of 1 ohm cm. is ground and etched in known manner for example, with a mixture of hydrofluoric acid and hydrogen peroxide. After rinsing and drying, it is covered with a powder containing 5% of $H_3PO_4$ (the phosphor component being the active substance) and 95% of $SiO_2$, which is the indifferent material. It is now heated for six hours at a temperature of 800° C. in a neutral gas, for example nitrogen or a mixture of nitrogen and hydrogen. After cooling and removal of the powder, the germanium is found to have changed to the n-conductivity type up to a depth of about 20 microns. The said powder has been found to have given off phosphorus, which acts as a donor impurity.

II. In a similar test, a thin silicon disc of the p-type having a specific resistance of 10 ohms cm. and covered with a mixture of quartz powder and phosphoric acid was heated for three hours at 1250° C. in nitrogen. The silicon was thus converted into the n-type up to a depth of 20 microns. However, for comparison purposes, if phosphoric acid as a liquid drop were placed on the disc, followed by heating, the conversion was found to take place up to a depth of 1 micron only.

III. A thin silicon disc of the n-type having a specific resistance of 3 ohms cm., after grinding, etching, rinsing and drying, was heated for 2 hours at 1150° C., in a mixture of 96% of quartz powder and 4% of boron trioxide in an atmosphere of nitrogen. After cooling and removal of the powder, the body was found to have assumed p-type conductivity up to a depth of 10 microns.

For comparison purposes it is mentioned here that, if the silicon would have been heated in undiluted boron trioxide up to a temperature of 1100° C., the latter would have fused and produced a vitreous layer which would have broken the silicon body during cooling.

IV. A thin silicon disc of the p-type having a specific resistance of 10 ohms cm., after grinding, etching, rinsing and drying, was heated for 3 hours at 1200° C. in a mixture of 96% of quartz powder and 4% of antimony trioxide in an atmosphere of nitrogen. After cooling and removal of the powder, the silicon was found to have changed to the n-type up to a depth of 1 micron.

V. A thin germanium disc of the p-type having a specific resistance of 1 ohm cm. and covered with a mixture consisting of 96% of quartz powder and 4% of arsenic trioxide, was heated for 1 hour at 800° C. in an inert atmosphere. After cooling, it was found to have changed to the n-type up to a depth of 10 microns. When the experiment was repeated, during which the arsenic trioxide was provided as powder on the disc, the depth of penetration of the n-layer was 0.1 micron only.

VI. A thin silicon disc of the n-type having a specific resistance of 3 ohms cm. and covered with a powdered mixture of 96% of quartz powder, 2% of gallium trioxide and 2% of antimony trioxide, was heated in an atmosphere of nitrogen for two hours at a temperature of 1200° C.

Due to the fact that the diffusing rate of the gallium, which is an acceptor, is greater than that of the donor antimony, while on the other hand the solubility of antimony is higher than that of gallium, the silicon, as rackoned from the treated surface, was found to have n-type conductivity up to a depth of 1 micron, followed by a layer of the p-type having a thickness of 9 microns.

When it is desirable for the treatment of the semi-conductive body to take place only locally, the mixture of the indifferent material and the active material may be brought into contact with the semi-conductive body in the solid state, for example as a pastille, a pill or a thin rod.

An indifferent material which is highly suitable is silicon dioxide in the form of ground quartz, but many other substances, such as magnesium oxide, aluminum oxide, stannic oxide and zirconium oxide may also be used.

It is to be noted that the manner in which the active impurity material is mixed with the indifferent on inert substance, is subject to variations. If the active material is a liquid, the indifferent substance may be impregnated with it; a gas may be absorbed by the indifferent substance. As an alternative many other active materials, for example metals, may be applied to the indifferent material by vaporisation, so that each powder particle is surrounded by a very thin layer of the active material.

What is claimed is:

1. A method of effecting a change in the character of a portion of a semi-conductive monocrystalline body selected from the group consisting of silicon and germanium, comprising bring into contact with said body portion a powdery mixture comprising as a major constituent a refractory, inert substance whose melting point substantially exceeds that of the semi-conductive body and as a minor constituent an active impurity substance capable of effecting the change desired when incorporated in the body portion, and heating said contacting body portion and powdery mixture in an inert atmosphere and at a temperature below the fusion temperature of the inert substance and at which active substance is freed from the mixture and caused to diffuse into the body portion and thereby effect the change desired.

2. A method as set forth in claim 1 wherein the minor constituent constitutes of the order of 5% of the mix.

3. A method of changing the conductivity of a plurality of semi-conductive, monocrystalline bodies, selected from the group consisting of silicon and germanium, comprising dispersing said bodies throughout a powder mixture comprising as a major constituent a refractory, oxidic, inert substance whose melting point substantially exceeds that of the semi-conductive body and as a minor constituent an active impurity substance capable of effecting the change desired when incorporated in the bodies, and heating said mixture in the presence of a flowing inert gas at a temperature below the fusion temperature of the inert substance and at which active substance is freed from the mixture and caused to diffuse into the bodies and thereby effect the change desired.

4. A method as set forth in claim 3 wherein the impurity substance constitutes of the order of 5% of the mix.

5. A method as set forth in claim 3 wherein the inert substance is powdery silica.

References Cited in the file of this patent

UNITED STATES PATENTS

| 2,071,533 | Ihrig | Feb. 23, 1937 |
| 2,622,043 | Roush | Dec. 16, 1952 |
| 2,629,672 | Sparks | Feb. 24, 1953 |
| 2,695,852 | Sparks | Nov. 30, 1954 |
| 2,802,760 | Derick et al. | Aug. 13, 1957 |
| 2,804,405 | Derick et al. | Aug. 27, 1957 |

UNITED STATES PATENT OFFICE

CERTIFICATE OF CORRECTION

February 10, 1959

Patent No. 2,873,221

Louis Marius Nijland et al.

It is hereby certified that error appears in the printed specification of the above numbered patent requiring correction and that the said Letters Patent should read as corrected below.

Column 2, line 17, for "dagrammatically" read -- diagrammatically --; column 3, line 18, for "rackoned" read -- reckoned --; column 4, line 2, for "bring" read -- bringing --; line 19, for "powder" read -- powdery --.

Signed and sealed this 28th day of July 1959.

(SEAL)
Attest:

KARL H. AXLINE
Attesting Officer

ROBERT C. WATSON
Commissioner of Patents